US010542394B1

(12) United States Patent
Mahalank (10) Patent No.: US 10,542,394 B1
(45) Date of Patent: Jan. 21, 2020

(54) METHODS, SYSTEMS, AND COMPUTER REDABLE MEDIA FOR OPTIMIZED SHORT MESSAGE SERVICE (SMS)-BASED INTERNET OF THINGS (IOT) DEVICE TRIGGERING

(71) Applicant: Oracle International Corporation, Redwood Shores, CA (US)

(72) Inventor: Shashikiran Bhalachandra Mahalank, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/035,532

(22) Filed: Jul. 13, 2018

(51) Int. Cl.
*H04W 4/70* (2018.01)
*H04W 4/14* (2009.01)
*H04W 8/00* (2009.01)

(52) U.S. Cl.
CPC ............. *H04W 4/14* (2013.01); *H04W 4/70* (2018.02); *H04W 8/005* (2013.01)

(58) Field of Classification Search
CPC .................................................. H04W 36/023
See application file for complete search history.

(56) References Cited

U.S. PATENT DOCUMENTS

| | | | | |
|---|---|---|---|---|
| 9,554,234 | B2 * | 1/2017 | Kim ....................... | H04W 4/70 |
| 10,104,567 | B2 * | 10/2018 | Kodaypak ................ | H04W 4/70 |
| 2014/0219182 | A1 * | 8/2014 | Chandramouli ...... | H04W 60/00 |
| | | | | 370/328 |

OTHER PUBLICATIONS

"3rd Generation Partnership Project; Technical Specification Group Core Network and Terminals; Diameter-based T4 interface for communications with packet data networks and applications (Release 15)," 3GPP TS 29.337, V15.0.0, pp. 1-24 (Jun. 2018).

"3rd Generation Partnership Project; Technical Specification Group Core Network and Terminals; Home Subscriber Server (HSS) diameter interfaces for interworking with packet data networks and applications (Release 15)," 3GPP TS 29.336, V15.3.0, pp. 1-71 (Jun. 2018).

"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128, V15.3.0, pp. 1-51 (Jun. 2018).

(Continued)

*Primary Examiner* — Michael T Vu
(74) *Attorney, Agent, or Firm* — Jenkins, Wilson, Taylor & Hunt, P.A.

(57) ABSTRACT

A method for optimized short message service (SMS)-based Internet of things (IoT) device triggering. One method includes receiving, at a machine type communications interworking function (MTC-IWF), a request for sending a trigger message to an IoT device. The method further includes generating, at the MTC-IWF, an SMS message for triggering the IoT device. The method further includes identifying a serving node for the IoT device. The method further includes transmitting, by the MTC-IWF, the SMS message to the serving node for the IoT device and thereby bypassing an SMS-service center. The method further includes receiving, by the MTC-IWF, from the serving node, and in response to successful delivery of the SMS message to the IoT device, confirmation of delivery of the SMS message.

18 Claims, 8 Drawing Sheets

(56) References Cited

OTHER PUBLICATIONS

"3rd Generation Partnership Project; Technical Specification Group Core Network and Terminals; T8 reference point for Northbound APIs; (Release 15)," 3GPP TS 29.122, V15.0.0, pp. 1-255 (Jun. 2018).

"3rd Generation Partnership Project; Technical Specification Group Services and System Aspects; Architecture enhancements to facilitate communications with packet data networks and applications (Release 15)," 3GPP TS 23.682, V15.5.0, pp. 1-125 (Jun. 2018).

"3rd Generation Partnership Project; Technical Specification Group Core Network and Terminals; Diameter based protocols to support Short Message Service (SMS) capable Mobile Management Entities (MMEs) (Release 15)," 3GPP TS 29.338, V15.0.0, pp. 1-50 (Sep. 2017).

"Digital cellular telecommunications system (Phase 2+); Universal Mobile Telecommunications System (UMTS); LTE; Architecture enhancements to facilitate communications with packet data networks and applications (3GPP TS 23.682 verson 11.5.0 Release 11)"ETSI TS 123 682 V11.5.0, pp. 1-31 (Sep. 2013).

\* cited by examiner

METHODS, SYSTEMS, AND COMPUTER REDABLE MEDIA FOR OPTIMIZED SHORT MESSAGE SERVICE (SMS)-BASED INTERNET OF THINGS (IOT) DEVICE TRIGGERING

TECHNICAL FIELD

The subject matter described herein relates to triggering IoT devices. More particularly, the subject matter described herein relates to optimized SMS-based IoT device triggering.

BACKGROUND

IoT devices, such as sensors, often operate on battery power in a sleep mode until triggered by an external signal to provide measurement or other data. One type of signal used to trigger IoT devices is an SMS message. In one implementation, a machine type communications interworking function (MTC-IWF) contacts a short message service center (SMSC), which sends an SMS message to the IoT device to trigger the device to perform an application-specific function, such as waking up.

One problem with the above-described IoT device triggering method is that the SMSC is an expensive piece of network equipment. Requiring an SMSC to perform IoT device triggering may be cost prohibitive, especially as the number of IoT devices increases. Another problem with using an SMSC for IoT device triggering is that extra messaging between the MTC-IWF and the SMSC is required for SMS message delivery and delivery confirmation. This messaging increases with the number of IoT devices and thus can consume a significant amount of bandwidth in a network operator's network where SMS message traffic is carried. The use of an SMSC for IoT device triggering also introduces latency in IoT device triggering transactions.

Yet another problem with using an SMSC for IoT device triggering is that the SMSC is vulnerable to security attacks. For example, an SMSC performs SMS forwarding transactions for IoT device transactions and non-IoT device transactions. If an attacker inserts attack code in an SMS message, the SMSC may inadvertently receive and store the message, execute the attack code, and perform a malicious operation specified by the attack code. Such an attack could prevent triggering of IoT devices or allow unauthorized access to IoT devices.

Accordingly, in light of these and other difficulties, there exists a need for methods, systems and computer readable media for optimized IoT device triggering.

SUMMARY

The subject matter described herein includes methods, systems, and computer readable media for optimized short message service (SMS)-based Internet of things (IoT) device triggering. One method includes receiving, at a machine type communications interworking function (MTC-IWF), a request for sending a trigger message to an IoT device. The method further includes generating, at the MTC-IWF, an SMS message for triggering the IoT device. The method further includes identifying a serving node for the IoT device. The method further includes transmitting, by the MTC-IWF, the SMS message to the serving node for the IoT device and thereby bypassing a SMS service center. The method further includes receiving, by the MTC-IWF, from the serving node, and in response to successful delivery of the SMS message to the IoT device, confirmation of delivery of the SMS message.

According to one aspect of the subject matter described herein generating the SMS message includes generating, by the MTC-IWF, a mobile application part (MAP) forward short message (FSM) and transmitting the MAP FSM message to the serving node for delivery to the IoT device.

According to another aspect of the subject matter described herein, generating the SMS message includes generating a Diameter message and transmitting the Diameter message to the serving node for delivery to the IoT device.

According to another aspect of the subject matter described herein, the IoT device is a mobile device and identifying the serving node includes querying a home location register (HLR) or a home subscriber server (HSS) with an identifier for the IoT device to determine an address or other identifier for the serving node.

According to another aspect of the subject matter described herein, the IoT device is a stationary device and wherein the identifying the serving node includes accessing a database maintained by the MTC-IWF with an identifier for the IoT device to determine an address or other identifier for the serving node.

According to another aspect of the subject matter described herein, in response to failure of delivery of the SMS message, a method for optimized delivery of an IoT device trigger message includes buffering the SMS message, subscribing to receive notification of availability of the IoT device, receiving an indication of availability of the IoT device, and, in response, re-attempting delivery of the SMS message.

In one exemplary implementation of the subject matter described herein, the serving node for an IoT device is a mobile switching center (MSC).

In an alternate implementation of the subject matter described herein, the serving node comprises a mobility management entity (MME).

In one exemplary implementation of the subject matter described herein, the MTC-IWF is a stand alone device.

In an alternate implementation of the subject matter described herein, the MTC-IWF is a component of a service capabilities exposure function (SCEF).

According to another aspect of the subject matter described herein, a system for optimized short message service (SMS)-based Internet of things (IoT) device triggering includes a machine type communications interworking function (MTC-IWF) device including at least one processor. The system further includes an IoT device triggering module implemented by the at least one processor for receiving a request for triggering an IoT device, generating, an SMS message for triggering the IoT device, identifying a serving node for the IoT device, transmitting, the SMS message to the serving node for the IoT device, and receiving, from the serving node, and in response to successful delivery of the SMS message to the IoT device, confirmation of delivery of the SMS message.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be

DETAILED DESCRIPTION

Figure 1:
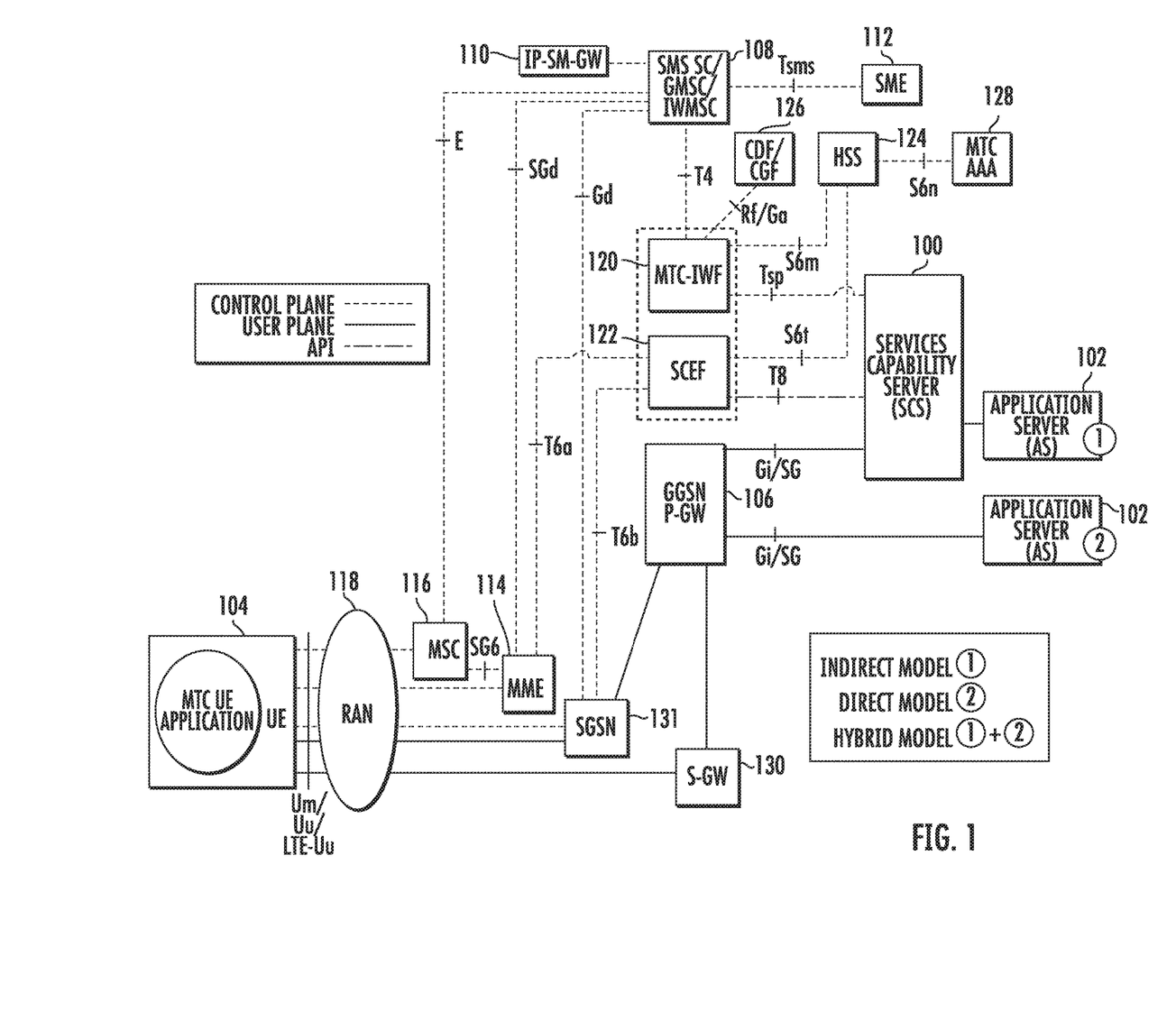
FIG. 1 is a diagram of a network architecture for delivering trigger messages to IoT devices.

FIG. 1 is a block diagram illustrating an exemplary architecture defined in Third Generation Partnership Project 3GPP TS 23.682, V15.5.0, June 2018, for delivering trigger messages to IoT devices. Referring to FIG. 1, the architecture includes a service capability server (SCS) 100 that hosts one or more application servers (aSs) 102 that deliver trigger messages to a UE 104 with a machine type communications (MTC) UE application. The MTC UE application enables UE 104 to function as an IoT device, such as a sensor, and communicate sensor data to the network. Hereinafter, UE 104 with the MTC application will be referred to as IoT device 104. The architecture where application servers deliver trigger messages to UEs via an SCS is referred to in 3GPP TS 23.682 as the indirect delivery model. In an alternate architecture, an application server 102 may deliver trigger messages to IoT device 104 via a gateway general packet radio service (GPRS) support node (GGSN) or packet gateway (PGW) 106 without going through a service capability server. This method is referred to in 3GPP TS 23.682 as the direct model.

In either case, according to 3GPP TS 23.682, SMS messages are delivered by a message service center, which is illustrated in FIG. 1 as short message service-service center/gateway message service center/inter-working message service center (SMS-SC/GMSC/IWMSC) 108 (hereinafter, SMS-SC 108). SMS-SC 108 is the node responsible for delivering SMS messages to IoT devices. An Internet protocol short message gateway (IP-SM-GW) 110 may support delivery of SMS messages via an Internet protocol network. A short message entity (SME) 112 may communicate with SMS-SC 108 over a $T_{SMS}$ interface.

In order to deliver SMS messages to IoT device 104, SMS-SC 108 communicates with either a mobility management entity (MME) 114 or mobile switching center (MSC) 116. MME 114 or MSC 116 communicates with IoT device 104 via the radio access network (RAN) 118.

Also illustrated in FIG. 1 is the machine type communications-interworking function (MTC-IWF) 120 and service capability exposure function (SCEF) 122. MTC-IWF 120 performs interworking functions to allow applications, such as applications hosted on application servers 102 to communicate with IoT devices. SCEF 122 likewise facilitates communication between applications and IoT devices, such as IoT device 104. MTC-IWF 120 and SCEF 122 communicate with home subscriber server (HSS) 124 to obtain serving identity identification information for IoT devices. MTC-IWF 120 may also communicate with a charging data function (CDF) 126 to obtain charging information for IoT devices. HSS 124 may communicate with a machine type communication authentication, authorization, and accounting (MTC-AAA) function 128 to authenticate IoT devices and perform accounting for transactions involving IoT devices. A serving gateway (S-GW) 130 and a serving general packet radio service support node (SGSN) 131 facilitate packet communications with IoT devices.

Figure 2:
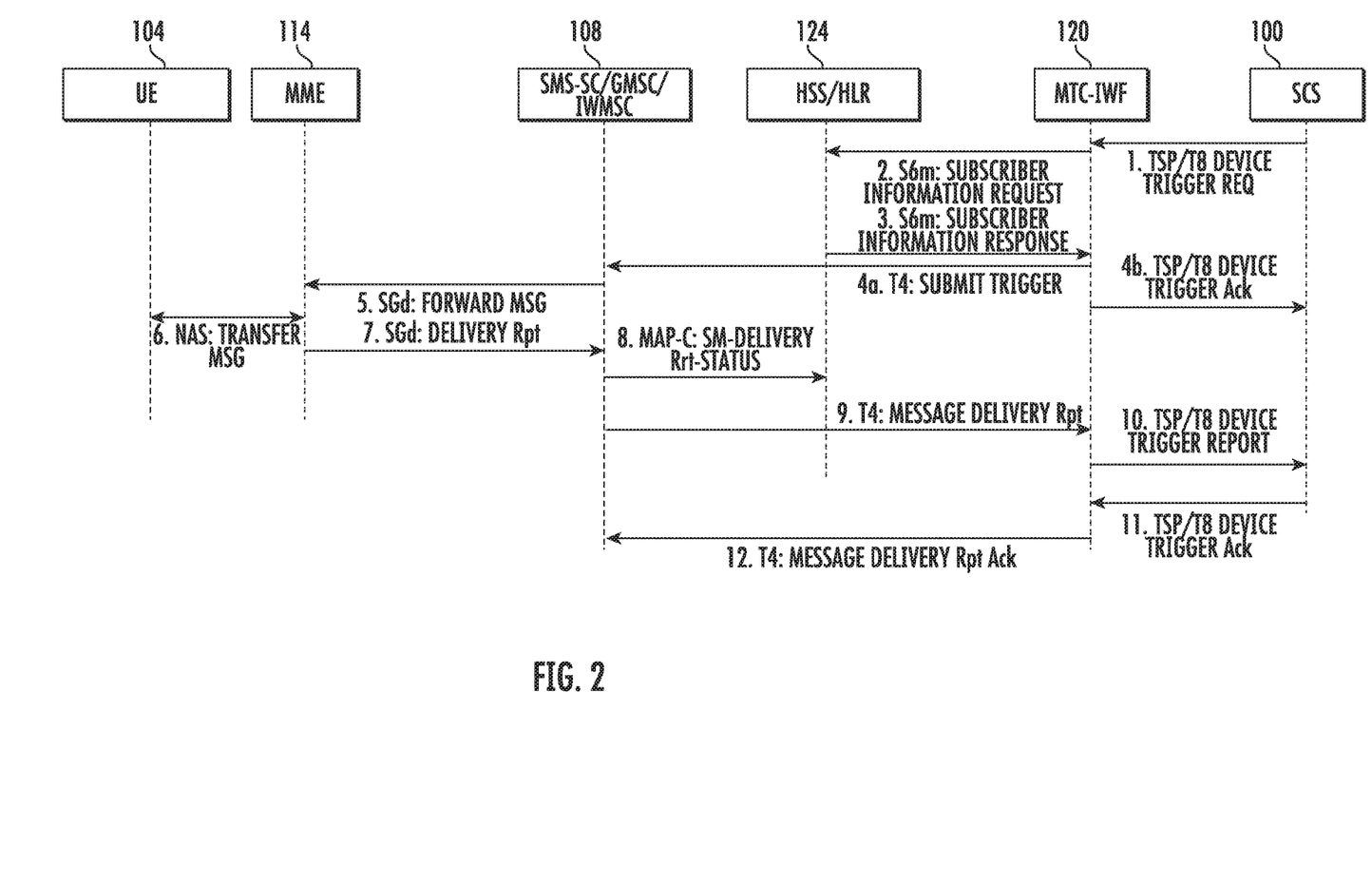
FIG. 2 is a message flow diagram illustrating conventional triggering of an IoT device using an SMS-SC.

In the architecture illustrated in FIG. 1, IoT devices are triggered using SMS message generated by SMS-SC 108. Such triggering involves messaging between MTC-IWF 120 and SMS-SC 108 over the T4 interface. FIG. 2 is a message flow diagram illustrating an example of such messaging. Referring to FIG. 2, in line 1, to initiate IoT device triggering, SCS/AS 100 sends a device trigger request to a MTC-IWF 120 either through a T8 interface or Tsp interface for triggering an IoT device 104 to perform an application-specific function, such as waking up. The communication illustrated in FIG. 2 follows the indirect model because the device trigger request originates from the SCS function of SCS/AS 100. If the device trigger request had originated from an AS without utilizing an SCS, the communication would follow the direct method.

The device trigger request identifies IoT device 104 using an identifier, such as a mobile subscriber integrated services digital network (MSISDN) number or other identifier. Device triggering may be subscription based. Subscription information may be stored by IoT device 104 that indicates whether or not SCS/AS 100 is allowed to trigger IoT device 104. In this example, it is assumed that SCS/AS 100 is allowed to trigger IoT device 104.

In line 2 of the message flow diagram, MTC-IWF 120 sends a subscriber information request through the S6m interface to HSS/HLR 124 to resolve the external identifier or MSISDN to an international mobile station identifier (IMSI) and retrieve the related HSS stored routing information including the identities of the IoT device's serving core network (CN) node(s). In this case, it is assumed that the serving CN node is MME 114.

In line 3 of the message flow diagram, HSS/HLR 124 sends a subscriber information response to MTC-IWF 120. The IMSI of IoT device 104 and the serving CN node identifier (i.e., MSC address or MME identity) are included in this message.

After receiving the IMSI and the MSC or MME identity, MTC-IWF 120 selects, based on configured information, a suitable SMS-SC for generating and sending the SMS message to trigger IoT device 104. In line 4a of the message flow diagram, MTC-IWF 120 generates and sends a submit trigger message to SMS-SC 108 using the T4 interface. The submit trigger message may include an external identifier or MSISDN, an IMSI, and a serving node ID, which is either an MSC or MME identity.

In line 5, SMS-SC 108, in response to the submit trigger message, uses either a mobile application part (MAP) mobile terminated forward short message (MT-FSM) or a Diameter message to send the SMS message to the MME over the MAP-E or SGd interface.

In line 6, MME 114 delivers the trigger message to IoT device 104 using the SMS over SGS procedure.

In line 7, MME 114 sends back a positive acknowledgement to the MT-FSM from line 5.

In line 8, if delivery is not successful, SMS-SC 108 sends a delivery report to HSS/HLR 124 requesting that HSS/HLR 124 add the SMS-SC address to the message waiting list for a redelivery attempt.

In lines 9-12, SMS-SC 108 sends a delivery report to MTC-IWF 120 to allow MTC-IWF to indicate the delivery status to SCS/AS 100. In line 9, SMS-SC 108 sends a delivery report to MTC-IWF 120. In line 10, MTC-IWF 120 sends a device trigger report to SCS 100 over the Tsp or T8 interface. In line 11, SCS 100 acknowledges the device trigger report. In line 12, MTC-IWF 120 sends a message delivery report acknowledgement message to SMS-SC 108.

Figure 3:
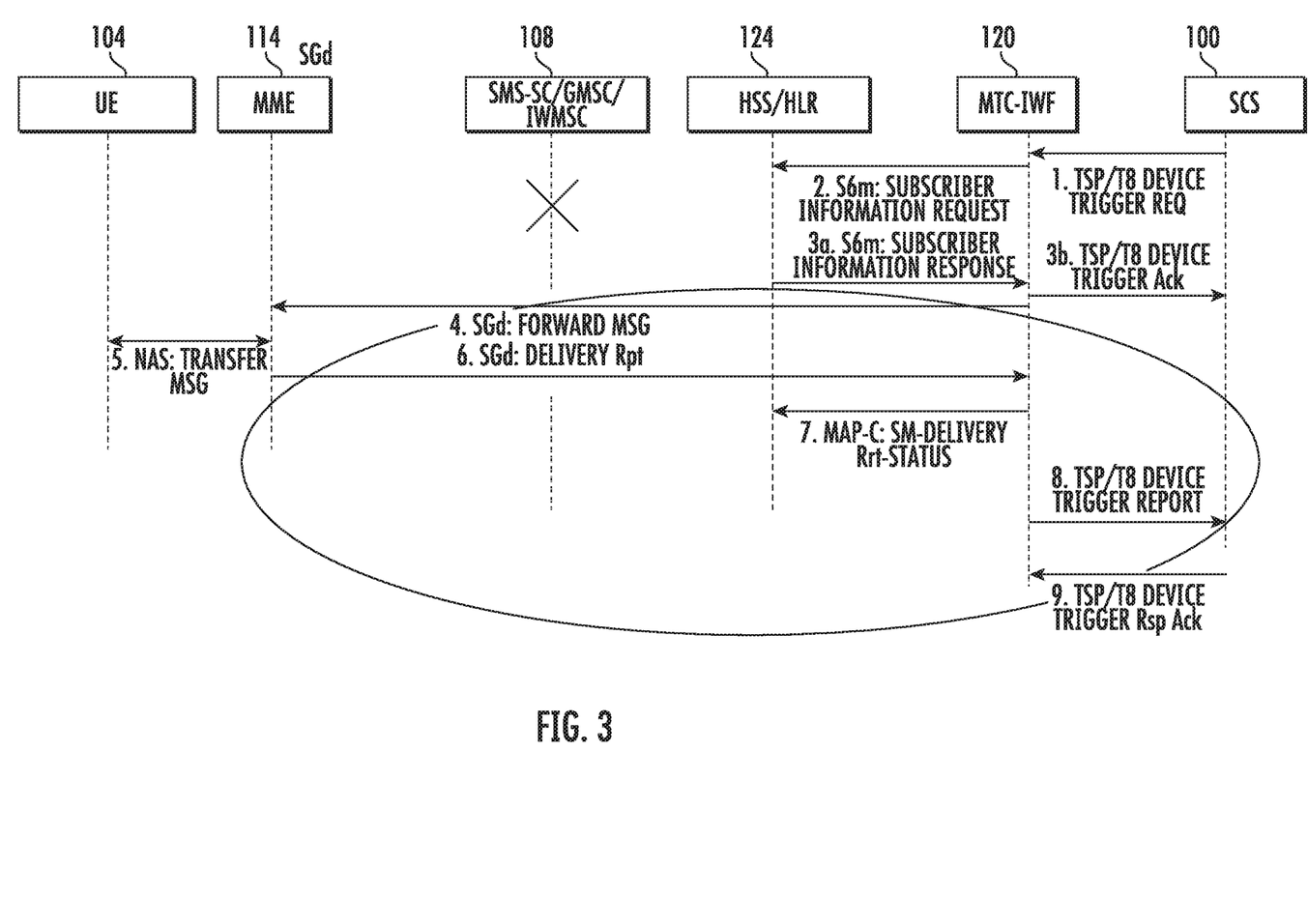
FIG. 3 is message flow diagram illustrating optimized SMS-based triggering of an IoT device using an MTC-IWF to generate and send the trigger message to the serving node of a mobile IoT device and thereby bypass the SMS-SC.

Rather than using the SMS-SC to deliver trigger messages to IoT devices, the subject matter described herein eliminates the need to use the SMS-SC in the trigger message delivery process and instead allows SMS-based trigger messages to be sent directly from the MTC-IWF. FIG. 3 illustrates such an architecture. Referring to FIG. 3, SMS-SC 108 is eliminated from the IoT device triggering architecture. In line 1 of the message flow diagram, SCS 100 sends a device trigger request to MTC-IWF 120. The device trigger request may identify the IoT device being triggered by an external identifier, such as an MSISDN number. The delivery model illustrated in FIG. 3 is the indirect model sine the trigger message is being sent from SCS 100. In an alternate implementation, the trigger message may be sent from an AS, such as AS 102, to MTC-IWF 120.

In line 2 of the message flow diagram illustrated in FIG. 3, MTC-IWF 120 sends a subscriber information request message to HSS/HLR 124. The subscriber information request message requests information concerning IoT device 104, such as an IMSI and a serving entity identifier. In line 3A of the message flow diagram, HSS/HLR 124 responds to the subscriber information request message with the requested subscriber information. In line 3B, MTC-IWF 120 sends a device trigger acknowledgement message to SCS 100.

In line 4 of the message flow diagram, rather than communicating via an SMS-SC, MTC-IWF 120 sends a trigger message directly to the serving entity identified in the subscriber information response message. In the illustrated example, the serving entity is MME 114. In line 5, MME 114 delivers the trigger message to IoT device 104 via RAN 118. In line 6, MME 114 sends a delivery acknowledgement message to MTC-IWF 120. In line 7, MTC-IWF sends a MAP delivery report status information to HSS/HLR 124. In lines 8 and 9, MTC-IWF 120 and SCS 100 exchange device trigger status information. Thus, using the architecture illustrated in FIG. 3, an IoT device is triggered without using an SMSC.

If the IoT device is stationary, it is not necessary to contact an HSS or HLR to obtain serving entity identification information. Instead, SCS 100 may be configured with contact information for the device. For stationary IoT devices, such as water meters, power meters, and home appliances, the serving public land mobile network (PLMN) node can be preconfigured at MTC-IWF 120. This configuration can include device identifiers, such as the MSISDN and/or IMSI of the stationary IoT devices and the corresponding and serving PLMN node id of SS7 service switching point (SSP), MME, or MSC serving the stationary IoT devices. For example, MTC-IWF 120 may be configured with MSISDN X, IMSI X and MME X identifiers can be configured for water meter device X. Such pre-configuration of the MTC-IWF eliminates the need for HSS interrogation. When an application server instructs MTC-IWF 120 to generate and send an IoT device trigger message to a stationary IoT device, MTC-IWF 120 accesses its internal stationary IoT device database using the MSISDN number of the stationary IoT device, locates the corresponding record, and extracts the IMSI and the serving node identifier or address. MTC-IWF 120 uses the information extracted from the record to generate and send an SMS-based IoT device trigger message to the serving node identified in the record.

Figure 4:
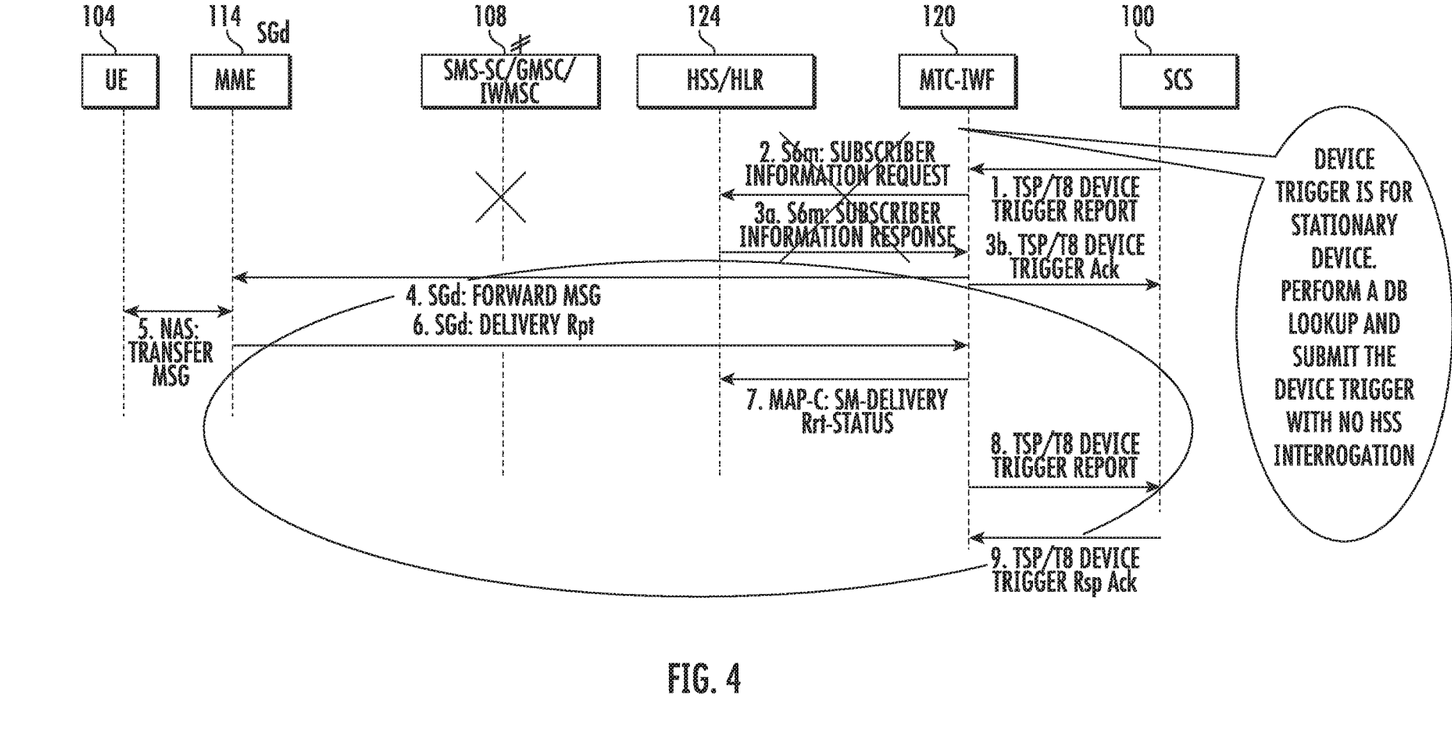
FIG. 4 is message flow diagram illustrating the use of an MTC-IWF for delivering trigger message to stationary IoT devices using preconfigured serving node identification information.

FIG. 4 is a message flow diagram illustrating the delivery of an IoT device trigger message to a stationary IoT device without interrogating HSS/HLR 124. Referring to FIG. 4, in line 1 of the message flow diagram, SCS 100 sends a device trigger request to MTC-IWF 120. Lines 2 and 3A, which are the interrogation of HLR/HSS 124 and the corresponding response, are eliminated from the message flow diagram. In line 3B, MTC-IWF 120 acknowledges the trigger request message to SCS 100. In line 4 of the message flow diagram, MTC-IWF 120 sends the trigger message to MME 114, which delivers the trigger message in line 5 to IoT device 104. In line 6, MME 114 reports delivery of the trigger message to MTC-IWF 120. In line 7, MTC-IWF sends a MAP-C SM delivery report message to HSS/HLR 124. In lines 8 and 9, MTC-IWF 120 and SCS 100 exchange device trigger report information. Thus, for stationary IoT devices, delivery of trigger messages can be achieved without an SMS-SC and without querying an HSS or HLR for serving entity identification information.

Figure 5:
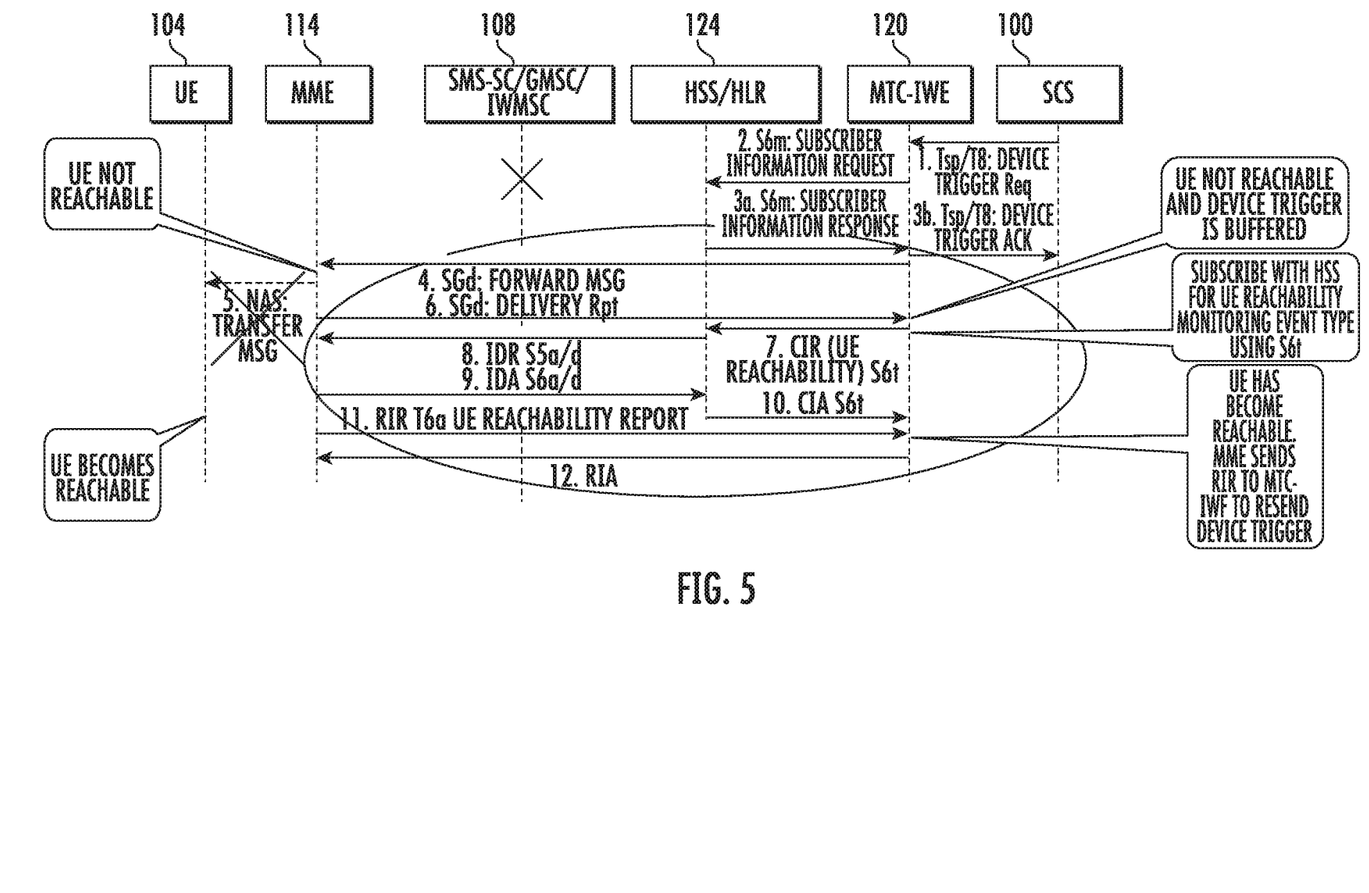
FIG. 5 is message flow diagram illustrating the use of an MTC-IWF for attempting delivery of a trigger message to an IoT device when the IoT device is initially unavailable.

According to yet another aspect of the subject matter described herein, an MTC-IWF may be capable of supporting additional delivery attempts of a trigger message to an IoT device when the IoT device is not available. FIG. 5 is a message flow diagram illustrating multiple delivery attempts of a trigger message to an IoT device when the IoT device is initially unavailable. Referring to FIG. 5, in line 1, to initiate IoT device triggering, a SCS/AS 100 sends a device trigger request to a MTC-IWF 120 either through a T8 interface or Tsp interface for triggering IoT device 104 to perform an application-specific function, such as waking up. The communication illustrated in FIG. 5 follows the indirect model because the device trigger request originates from the SCS function of SCS/AS 100. If the device trigger request had originated from an AS without passing through an SCS, the communication would follow the direct method.

The device trigger request identifies IoT device 104 using an identifier, such as a mobile subscriber integrated services digital network (MSISDN) number or other suitable identifier. Device triggering may be subscription based. Subscription information may be stored by IoT device 104. The subscription information may indicate whether or not SCS/AS 100 is allowed to trigger IoT device 104. In this example, it is assumed that SCS/AS 100 is allowed to trigger IoT device 104.

In line 2 of the message flow diagram, MTC-IWF 120 sends a subscriber information request through the S6m interface to HSS/HLR 124 to resolve the external identifier or MSISDN to an IMSI and retrieve the related HSS stored routing information including the identities of the IoT device's serving CN node(s). In this case, it is assumed that the serving CN node is MME 114.

In line 3a of the message flow diagram, HSS/HLR 124 sends a subscriber information response to MTC-IWF 120. The IMSI and the serving CN node identifier (i.e., MSC address or MME identity) are included in this message. In line 3b, MTC-IWF 120 sends a device trigger acknowledgement to SCS/AS 100

After receiving the MSC or MME identity, MTC-IWF 120 selects, based on configured information, a suitable SMS-SC for generating and sending the SMS message to trigger IoT device 104.

In line 4 of the message flow diagram, MTC-IWF 120 sends a message including the trigger message to MME 114 over the MAP-E or SGd interface. In line 5, MME 114 attempts to deliver the trigger message to IoT device 104 and determines that IoT device 104 is not reachable. In line 6, MME 114 responds to MTC-IWF 120 indicating that IoT device 104 is not reachable. In response, MTC-IWF 120 buffers the SMS message including the trigger message for a redelivery attempt. In line 7, MTC-IWF 120 subscribes with HSS/HLR 124 to receive updates regarding status information of IoT device 104. The subscription message is a configuration information request (CIR) message sent over the S6t interface. The S6t interface is a Diameter interface between the SCEF and the HSS for the configuration of monitoring events and reachability of IoT device 104. The CIR message includes an identifier, such as an IMSI or MSISDN identifying IoT device 104. Here, MTC-IWF 120 is leveraging or using the SCEF monitoring configuration report procedure to be advised of changes in state of IoT device 104.

In line 8, in response to the CIR message, HSS/HLR 124 sends a Diameter insert subscriber data request (IDR) message to MME 114 over the S6a/d interface. The IDR message requests information concerning the change in state of IoT device 104. In line 9, MME 114 responds to the IDR message by sending a Diameter insert subscriber data answer (IDA) message to HSS/HLR 124 confirming successful establishment of the subscription to receive notification of changes in state of IoT device 104. In line 10, HSS/HLR 124 sends a configuration information answer (CIA) message to HSS/HLR 124 confirming successful subscription to receive notifications of changes in state of IoT device 104

When IoT device 104 becomes available to receive SMS messages, MME 114 detects the change in state. In line 11 of the message flow diagram, MME 114 generates and sends to MTC-IWF 120 a reachability report on the T6a interface indicating that IoT device 104 is available to receive SMS messages. The message carrying the report is a reporting information request (RIR) command. The RIR command is a Diameter message used to carry monitoring event reporting information to the SCEF, and in this case, to MTC-IWF 120. MTC-IWF 120 receives the RIR command and generates and, in line 12 sends a reporting information answer (RIA) command to MME 114. The RIA command is a Diameter message sent from the MME to the SCEF, or in this case to MTC-IWF 120, that carries a result code indicating successful receipt of the RIR command.

After receiving notification of the change in state of IoT device 104, the process for delivering the trigger message to IoT device is the same as steps 4-9 illustrated in FIG. 4. Briefly, MTC-IWF 120 re-sends the trigger message to MME 114. MME 114 delivers the trigger message to IoT device 104 using the SMS over SGS procedure. MME 114 sends a delivery report to MTC-IWF 120 indicating successful delivery of the SMS message. MTC-IWF 120 sends a device trigger report to SCS 100, and SCS 100 acknowledges to device trigger report.

Accordingly, using the steps illustrated in FIG. 5, MTC-IWF 120 delivers a trigger message to IoT device 104 when IoT device 104 is initially unavailable. Such functionality avoids the need for an SMS-SC to act as a store and forward element for IoT device trigger message when IoT devices are initially unavailable.

Figure 6:
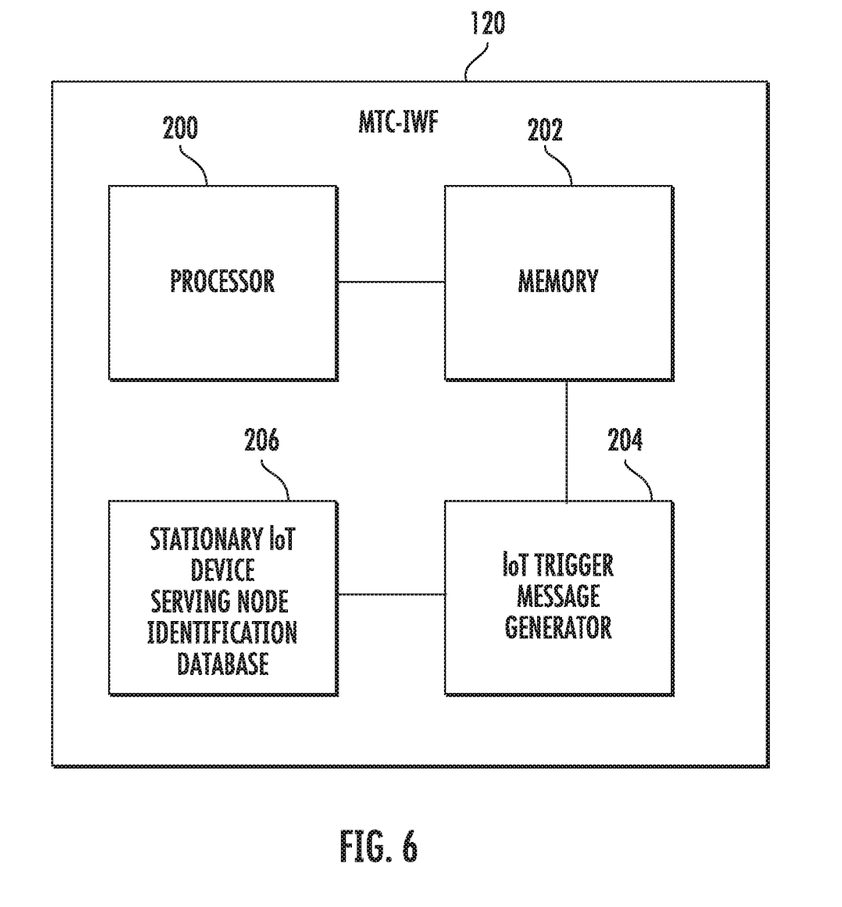
FIG. 6 is a block diagram illustrating an exemplary architecture of a stand-alone MTC-IWF configured to generate and send SMS-based trigger messages to IoT devices.

FIG. 6 is a block diagram of an exemplary architecture for MTC-IWF 120. Referring to FIG. 6, MTC-IWF 120 includes at least one processor 200 and a memory 202. MTC-IWF 120 includes an IoT trigger message generator 204 executable by processor 200 for generating IoT trigger message and sending the trigger messages to an MME or MSC without sending the trigger messages to an SMS-SC, using the steps illustrated in FIG. 3. IoT trigger message generator 204 may deliver trigger messages to mobile IoT devices using the steps illustrated in FIG. 3 or to stationary IoT devices using the steps illustrated in FIG. 4 and serving node identification information stored in a stationary IoT device serving node identification database 206. When an IoT device is not available to receive a trigger message, IoT trigger message generator 204 may also store the trigger message, subscribe to receive updates in IoT device state, and re-attempt delivery of the trigger message when the IoT device is determined to be available, using the steps illustrated in FIG. 5. IoT trigger message generator 204 may utilize SS7 or Diameter messages to deliver the trigger messages to the MSC or MME. For example, IoT trigger message generator 204 may utilize an SS7 MAP FSM message to deliver an IoT device trigger message to an MSC or a Diameter S6a message to deliver an IoT device trigger message to an MME.

Figure 7:
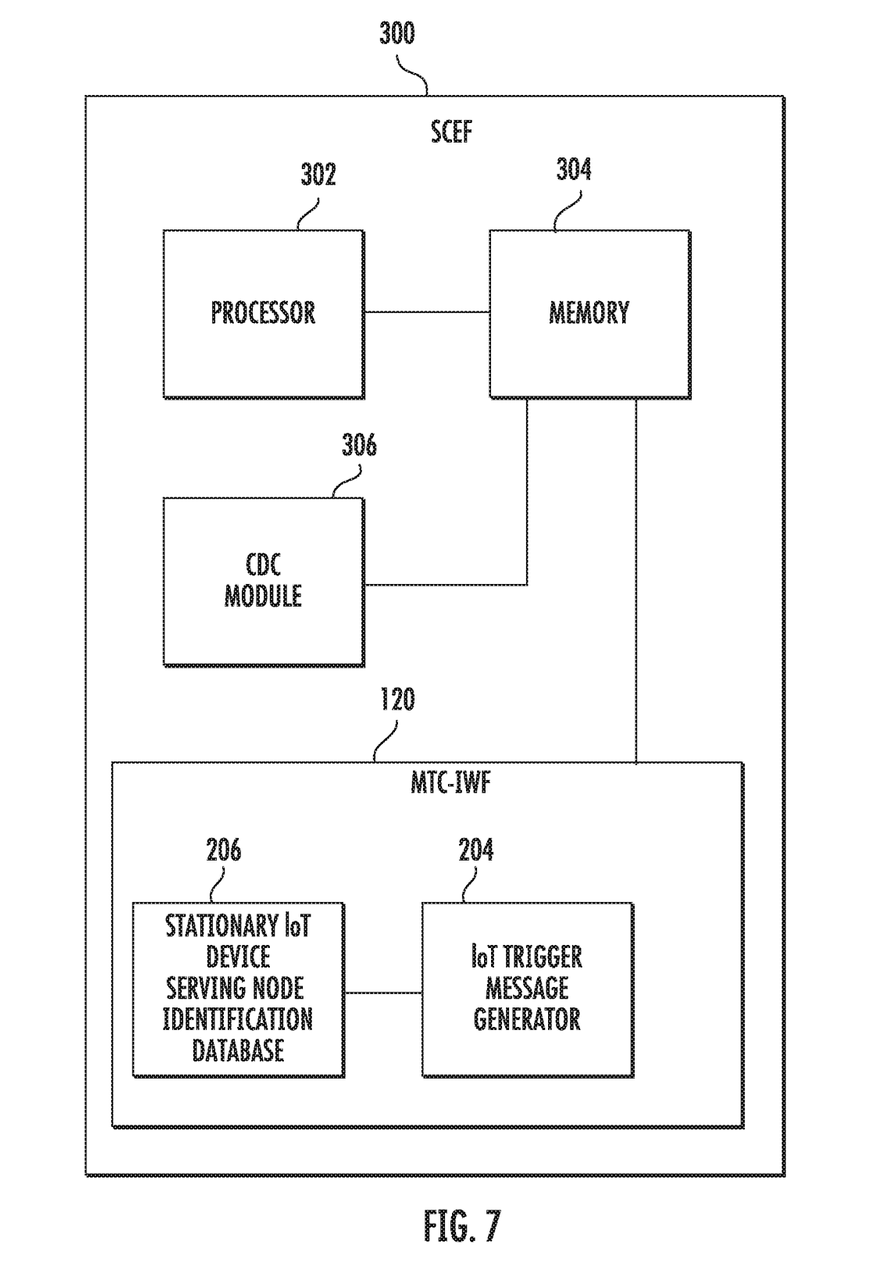
FIG. 7 is a block diagram illustrating an exemplary architecture of an MTC-IWF that is a component of a service capability exposure function (SCEF), where the combined node is configured to generate and send SMS-based trigger messages to IoT devices.

In FIG. 6, IoT trigger message generator 204 is a component of standalone MTC-IWF 120. In an alternate implementation, IoT trigger message generator 204 may be a component of a combined MTC-IWF and SCEF. FIG. 7 illustrates such an implementation. In FIG. 7, a SCEF platform 300 includes a processor 302 and a memory 304. SCEF platform further includes a cellular device connectivity (CDC) module 306 that provides SCEF functionality and MTC-IWF 120, including trigger message generator 204 that generates and sends SMS-based IoT trigger messages in the manner described above with respect to FIGS. 3-5. In FIG. 7, CDC module 306 performs SCEF functionality as specified by 3GPP TS 23.682. Providing SCEF functionality includes providing access to 3GPP services for non-IP devices, such as IoT devices that do not implement an IP stack due to complexity and power conservation requirements. A typical IoT device that might require SCEF services is a sensor that transmits its data to a network periodically and then sleeps between transmissions to conserve energy. In the case of mobile devices, SCEF functionality provided by CDC module 306 may include determining the location and connectivity of the mobile devices (including location and connectivity of non-IP devices) using network resources, such as HSS/HLR 124 and MME 114, to avoid the need for the mobile devices to have built in location determining capabilities, such as GPS capabilities. CDC module 306 may also, for non-IP traffic from IoT device 104, determine whether to invoke IoT service handling based on the access point name or other attributes of a received message. IoT service handling is a function typically performed by SCS 100. Thus, the architecture illustrated in FIG. 7 combines SMS-based IoT device triggering, MTC-IWF functionality, SCEF functionality, and SCS functionality in a single platform.

Figure 8:
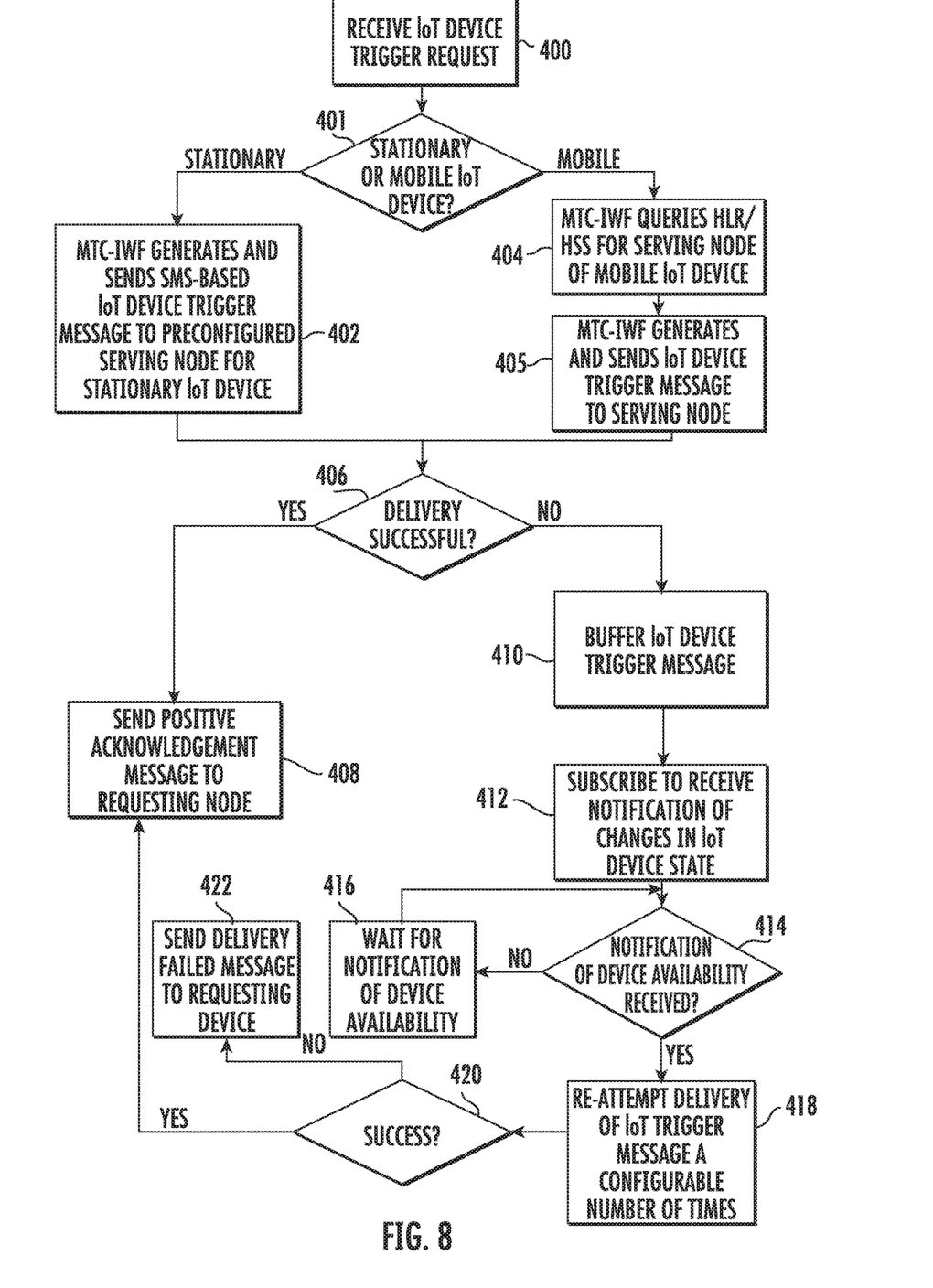
FIG. 8 is a flow chart illustrating an exemplary process for using an MTC-IWF to generate and send trigger messages to IoT devices.

FIG. 8 is a flow chart illustrating exemplary steps for SMS-based IoT device triggering using an MTC-IWF to generate and send SMS-based IoT device trigger messages. Referring to FIG. 8, in step 400, MTC-IWF 120 receives an IoT device trigger request. If IoT device triggering follows the direct model, the IoT device trigger request message may be send to MTC-IWF 120 from an application server. If IoT device triggering follows the indirect model, the IoT device trigger request may be sent by a service capability server to MTC-IWF 120 in response to a trigger request from an application server.

In step 401, it is determined whether the IoT device is mobile or stationary. To make this determination, MTC-IWF 120 may access its internal stationary IoT device database using the MSISDN or other identifier of the IoT device sought to be triggered. If MTC-IWF 120 locates a record in the database corresponding to the IoT device, MTC-IWF 120 may determine that the IoT device is stationary and may use information from the record to identify the serving node for the IoT device. If MTC-IWF 120 fails to locate a record for the IoT device in the stationary IoT device database, MTC-IWF 120 may determine that the IoT device is mobile. If the IoT device is stationary, control proceeds to step 402, where the MTC-IWF generates and sends an SMS-based IoT trigger message to the serving node for the stationary IoT device. For stationary IoT devices, such as utility meters, MTC-IWF 120 may be configured with the IoT device identity and, the address of the serving MME, MSC, SSP, or other serving node.

If the IoT device is mobile, control proceeds to step 404 where MTC-IWF 120 queries the HLR or HSS for the serving node address and any needed IoT device identifiers. For example, MTC-IWF 120 may query the HLR or HSS with the MSISDN number of the IoT device. The HLR or HSS may respond with the address or identifier of the serving MSC or MME and the IMSI of the IoT device. Once MTC-IWF 120 obtains the serving node identifier or address and the IoT device identifier, control proceeds to step 405 where the MTC-IWF generates and sends an IoT device trigger message to the serving node.

In step 406, MTC-IWF 120 determines whether delivery of the IoT device trigger message was successful. MTC-IWF 120 may determine whether or not delivery of the IoT device trigger message is successful based on whether or not an acknowledgement message is received from the serving node indicating successful delivery of the IoT device trigger message.

If delivery of the IoT device trigger message is successful, control proceeds to step 408 where MTC-IWF 120 sends an acknowledgement message to the node that requested the IoT device trigger message. For example, MTC-IWF 120 may send the acknowledgement message to the application server or service capability server that requested the IoT device trigger message.

If delivery of the IoT device trigger message is not successful, control proceeds to steps 410 and 412 where the MTC-IWF 120 buffers the IoT device trigger message and subscribes to receive notifications of changes in IoT device state. The subscription may be made to an HLR or HSS, which subscribes with the serving MME or MSC to receive notifications of changes in IoT device state.

In steps 414 and 416, MTC-IWF 120 waits for the notification of change in IoT device state. Once a message indicating that the IoT device is available is received, control proceeds to step 418 where MTC-IWF 120 re-attempts delivery of the IoT device trigger message. Delivery may be re-attempted a configurable number of times before the delivery process fails. In step 420, MTC-IWF 120 determines whether delivery of the IoT trigger message is successful. If delivery is successful, control proceeds to step 408 where a positive acknowledgement is sent to the requesting node. If delivery is not successful, control proceeds to step 422 where MTC-IWF 120 sends a message to the requesting node indicating failed delivery of the IoT device trigger message.

The subject matter described herein provides at least the following advantages to mobile network operators.

There is no need for a mobile network operator to have a dedicated SMS-SC network element in the core network to support SMS based device triggering. The mobile network operator may still have an SMS-SC to support delivery of non-IoT device SMS messages, e.g., SMS messages between mobile subscribers. However, the mobile network operator is not required to have a dedicated SMS-SC or additional SMS-SC capacity for delivering IoT device trigger messages. This reduction in required SMS-SC capacity can reduce operating and capital expenditures for the mobile network operator.

IoT trigger message delivery without an SMS-SC eliminates the need for T4 submit trigger messages and trigger delivery report messages between the MTC-IWF and the SMS-SC. For every device trigger request, there the following four Diameter messages are eliminated:
  T4 submit trigger request
  T4 submit trigger answer
  T4 message delivery report request
  T4 message delivery report acknowledgement answer For stationary IoT devices, configuring the MTC-IWF with contact information for the devices eliminates the need for HSS interrogation to obtain device contact information. The following messages are eliminated by static configuration of the MTC-IWF:
  subscriber information request (S6m)
  subscriber information answer (S6m)

The user of the MTC-IWF for IoT device trigger message delivery causes an overall reduction in signaling. Due to the large numbers of IoT devices that have and are expected to come online. The elimination of the T4 message exchange and the subscriber information request and answer messages for stationary devices greatly reduces signaling traffic caused by IoT device trigger messages.

The elimination of SMS-SC between MTC-IWF and MME decreases device trigger message latency. The removal of the SMS-SC from the trigger message path allows trigger messages to be delivered without the additional message exchanges described above and without an additional hop in the network between the MTC-IWF and the IoT device.

The use of the MTC-IWF to send trigger messages directly to the MME or the MSC also reduces the message processing burden on the SMS-SC. The SMS-SC delivers SMS messages between subscriber devices that are unrelated to IoT device triggering. If messages relating to IoT device triggering are offloaded from the SMS-SC, the processing burden on the SMS-SC is reduced, and the non-IoT SMS messages can be delivered more efficiently.

The MTC-IWF described herein allows trigger messages to be delivered to IoT devices even when the devices are not available. The MTC-IWF described herein buffers the trigger message payload when the device is not reachable and delivers the trigger when the device becomes reachable. The MTC-IWF uses the monitoring event configuration and report procedure to determine IoT device reachability.

Moving IoT device triggering functionality from the SMS-SC to the MTC-IWF reduces the security vulnerability of the IoT device triggering functionality. For example, SS7 security attacks that attack the SMS-SC using SMS messages will not affect IoT device triggering, because the MTC-IWF does not handle SMS messages that are not related to IoT device triggering. In one exemplary implementation, the MTC-IWF will be dedicated for IoT related traffic and will not process non-IoT SMS traffic.

An MTC-IWF for optimized SMS-based IoT device triggering as described herein can be implemented as an on-premises device located in a mobile network operator's network and managed by the mobile network operator. In an alternate implementation, the MTC-IWF for optimized SMS-based IoT device triggering may be provided as a cloud service accessible by mobile network operator for triggering IoT devices in the mobile network operator's network.

The disclosure of each of the following references is hereby incorporated herein by reference in its entirety:

3GPP TS 23.682 3GPP Architecture enhancements to facilitate communications with packet data networks and applications; Release 15, June 2018;

3GPP TS 29.336 Home Subscriber Server (HSS) diameter interface for interworking with packet data networks and applications, Release 15, June 2018;

3GPP TS 29.337 Diameter-based T4 interface for communications with package data networks and applications Release 15, June 2018;

3GPP TS 29.122 T8 reference point for northbound APIs, Release 15, June 2018

3GPP TS 29.338 3GPP Diameter based protocols to support Short Message Service (SMS) capable Mobile Management Entities (MMEs), Release 15, September 2017;

3GPP TS 29.128 3GPP Mobility Management Entity (MME) and Serving GPRS Support Node (SGSN) interfaces for interworking with packet data networks and applications, Release 15, June 2018

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for optimized short message service (SMS)-based Internet of things (IoT) device triggering, the method comprising:
   receiving, at a machine type communications interworking function (MTC-IWF), a request for sending a trigger message to an IoT device;
   generating, at the MTC-IWF, an SMS message for triggering the IoT device;
   identifying a serving node for the IoT device;
   transmitting, by the MTC-IWF, the SMS message directly from the MTC-IWF to the serving node for the IoT device using an S6a/d or mobile application part (MAP) interface and without using any short message service centers;
   receiving, by the MTC-IWF, from the serving node, and in response to successful delivery of the SMS message to the IoT device, confirmation of delivery of the SMS message; and
   in response to failure of delivery of the SMS message:
   buffering, by the MTC-IWF, the SMS message;
   subscribing, by the MTC-IWF, to receive notification of availability of the IoT device; and
   receiving, by the MTC-IWF, an indication of availability of the IoT device, and, in response, re-attempting, by the MTC-IWF, delivery of the SMS message.

2. The method of claim 1 wherein generating the SMS message includes generating, by the MTC-IWF, a mobile application part (MAP) forward short message (FSM) and transmitting the MAP FSM message to the serving node for delivery to the IoT device.

3. The method of claim 1 wherein generating the SMS message includes generating a Diameter message and transmitting the Diameter message to the serving node for delivery to the IoT device.

4. The method of claim 1 wherein the IoT device is a mobile device and wherein identifying the serving node includes querying a home location register (HLR) or a home subscriber server with an identifier for the IoT device to determine an address or other identifier for the serving node.

5. The method of claim 1 wherein the IoT device is a stationary device and wherein the identifying the serving node includes accessing a database maintained by the MTC-IWF with an identifier for the IoT device to determine an address or other identifier for the serving node.

6. The method of claim 1 wherein the serving node comprises a mobile switching center (MSC).

7. The method of claim 1 wherein the serving node comprises a mobility management entity (MME).

8. The method of claim 1 wherein the MTC-IWF is a stand alone device.

9. The method of claim 1 wherein the MTC-IWF is a component of a service capabilities exposure function (SCEF).

10. A system for optimized short message service (SMS)-based Internet of things (IoT) device triggering, the system comprising:
    a machine type communications interworking function (MTC-IWF) device including at least one processor; and
    an IoT device trigger message generator comprising a component of the MTC-IWF implemented by the at least one processor for receiving a request for sending a trigger message to an IoT device, generating an SMS message for triggering the IoT device, identifying a serving node for the IoT device, transmitting the SMS message directly from the MTC-IWF to the serving node for the IoT device using an S6a/d or mobile application part (MAP) interface and without using any short message service centers, and receiving, from the serving node and in response to successful delivery of the SMS message to the IoT device, confirmation of delivery of the SMS message, wherein the MTC-IWF is configured to, in response to failure of delivery of the SMS message:
    buffer the SMS message;
    subscribe to receive notification of availability of the IoT device; and
    receive an indication of availability of the IoT device, and, in response, re-attempt delivery of the SMS message.

11. The system of claim 10 wherein the IoT device trigger message generator is configured to generate a mobile application part (MAP) forward short message (FSM) and transmit the MAP FSM message to the serving node for delivery to the IoT device.

12. The system of claim 10 wherein the IoT device trigger message generator is configured to generate a Diameter message and transmit the Diameter message to the serving node for delivery to the IoT device.

13. The system of claim 10 wherein the IoT device is a mobile device and wherein MTC-IWF is configured to query a home location register (HLR) or a home subscriber server with an identifier for the IoT device to determine an address or other identifier for the serving node.

14. The system of claim 10, wherein the IoT device is a stationary device and wherein the MTC-IWF is configured to access a database maintained by the MTC-IWF with an identifier for the IoT device to determine an address or other identifier for the serving node.

15. The system of claim 10 wherein the serving node comprises a mobile switching center (MSC) or a mobility management entity (MME).

16. The system of claim 10 wherein the MTC-IWF is a stand alone device.

17. The system of claim 10 wherein the MTC-IWF is a component of a service capabilities exposure function (SCEF).

18. A non-transitory computer readable medium having stored thereon executable instructions that when executed by a processor of a computer control the computer to perform steps comprising:

receiving, at a machine type communications interworking function (MTC-IWF), a request for sending a trigger message to an IoT device;

generating, at the MTC-IWF, an SMS message for triggering the IoT device;

identifying a serving node for the IoT device;

transmitting, by the MTC-IWF, the SMS message directly from the MTC-IWF to the serving node for the IoT device using an S6a/d or mobile application part (MAP) interface and without contacting or passing through any short message service centers;

receiving, by the MTC-IWF, from the serving node, and in response to successful delivery of the SMS message to the IoT device, confirmation of delivery of the SMS message; and in response to failure of delivery of the SMS message:
    buffering, by the MTC-IWF, the SMS message;
    subscribing, by the MTC-IWF, to receive notification of availability of the IoT device; and
    receiving, by the MTC-IWF, an indication of availability of the IoT device, and, in response, re-attempting, by the MTC-IWF, delivery of the SMS message.

* * * * *

UNITED STATES PATENT AND TRADEMARK OFFICE
CERTIFICATE OF CORRECTION

PATENT NO. : 10,542,394 B1  
APPLICATION NO. : 16/035532  
DATED : January 21, 2020  
INVENTOR(S) : Mahalank Page 1 of 1

It is certified that error appears in the above-identified patent and that said Letters Patent is hereby corrected as shown below:

On the Title Page

Column 1, item (54) under Title, Line 2, delete "REDABLE" and insert -- READABLE --, therefor.

On page 2, Column 1, item (56) under Other Publications, Line 17, delete "verson" and insert -- version --, therefor.

In the Specification

In Column 1, Line 2, delete "REDABLE" and insert -- READABLE --, therefor.

In Column 3, Line 40, delete "(aSs)" and insert -- (ASs) --, therefor.

In Column 7, Line 8, after "100" insert -- . --.

In Column 7, Line 45, after "104" insert -- . --.

In Column 10, Line 33, after "answer" insert -- . --.

In Column 10, Line 40, after "(S6m)" insert -- . --.

In Column 11, Line 33, after "2018" insert -- ; --.

In Column 11, Line 40, after "2018" insert -- ; --.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*